June 11, 1929.  W. WEILER  1,717,289

DYNAMO ELECTRIC MACHINE

Filed Dec. 17, 1927

Inventor:
Wilhelm Weiler
by Alexander S. Lemire
His Attorney

Patented June 11, 1929.

1,717,289

UNITED STATES PATENT OFFICE.

WILHELM WEILER, OF BERLIN-NIEDERSCHONHAUSEN, GERMANY, ASSIGNOR TO GENERAL ELECTRIC COMPANY, A CORPORATION OF NEW YORK.

DYNAMO-ELECTRIC MACHINE.

Application filed December 17, 1927, Serial No. 240,894, and in Germany February 15, 1927.

My invention relates to dynamo electric machines and in particular to alternating current commutator machines in which damper windings are employed to assist in commutation. The object of the invention relates to a design of damper winding which will be to a large extent, selective with respect to different frequency fluxes of the machine to which it is applied. For example, the damper winding of the invention may be applied to an alternating current commutator motor to substantially annul certain harmonic fluxes which are higher than the fundamental and which are detrimental to successful commutation and at the same time the damper winding may be substantially non-responsive to the fundamental flux wave of the motor so as not to interfere with the torque characteristics.

Figure 1:
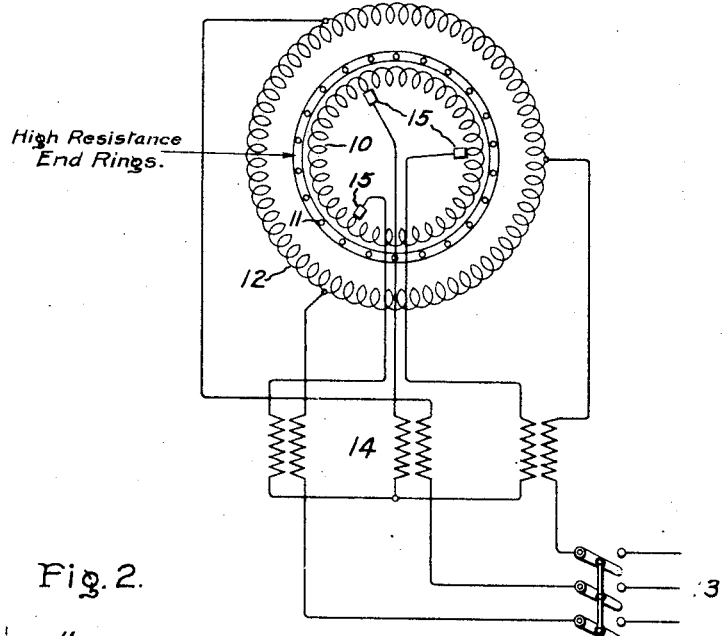
Figure 2:
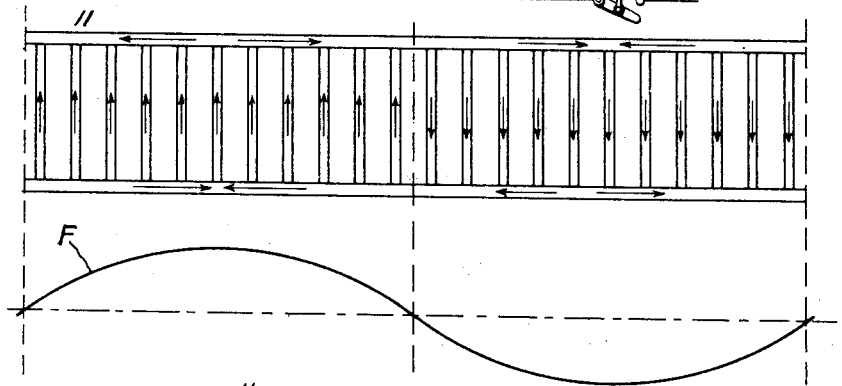
Figure 3:
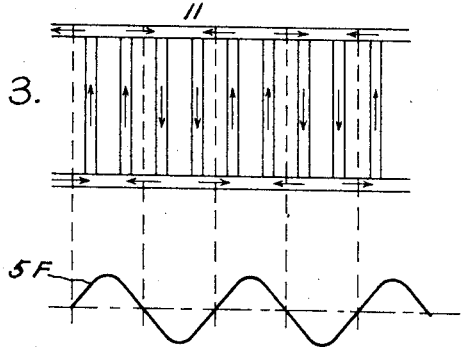

The features of my invention which are believed to be novel and patentable will be pointed out in the claims appended hereto. For a better understanding of my invention reference will be made in the following description to the accompanying drawing in which Fig. 1 represents a diagrammatic representation of my invention in which the damper winding, in the form of a squirrel cage, is mounted on the rotor member of an alternating current commutator motor; Fig. 2 represents the action of the damper winding of the invention with respect to the primary flux of the machine; and Fig. 3 represents the action with respect to a higher frequency flux.

In Fig. 1 I have shown an alternating current commutator motor provided with damper windings arranged on the rotor to annul certain high harmonic fluxes which would otherwise cause destructive sparking at the brushes. In order that these damper windings shall not interfere with desirable torque characteristics of the motor they are made in the form of a squirrel cage with exceptionally high resistance end rings which substantially prevents the circulation of currents therein which would otherwise tend to flow over a polar pitch of the winding in response to the fundamental flux of the machine.

In this figure, 10 represents a commutated winding located on the rotor and 11 the damper winding provided with exceptionally high resistance end rings. The stator carries the primary winding 12. In this case the stator winding is connected to the line 13 through a series transformer 14 the secondary of which is connected in star to the brushes 15 of the commutated winding 10. This type of machine has series characteristics and may be made to run at different speeds by adjustment of the brushes. The conditions are favorable for the formation of harmonic currents and fluxes of a higher order than the fundamental which if not properly taken care of will seriously interfere with successful commutation. The damper winding is provided to dissipate the energy of these higher harmonic fluxes and thus assist commutation. If the squirrel cage damper winding has the usual ratio of resistance in its bars and end rings it will dissipate the harmonic current forces, but it will also interfere with the torque characteristics of the machine because then normal secondary currents will be induced in the squirrel cage winding tending to give the machine shunt characteristics whereas series characteristics are desired. In accordance with my invention the bars of the squirrel cage are made of low resistance metal such as copper and the end rings are made of exceptionally high resistance metal such as German silver, and may have a specific resistance per unit length of from five to fifteen times as high as the same length of a copper bar. It is now seen that currents induced into the squirrel cage by the normal frequency current would be required to flow through the end rings a distance of a polar pitch and would thus meet with a very high resistance and consequently such currents do not flow to any appreciable extent. On the other hand, currents arising from the 3rd or the 5th or the $n$th harmonic traverse only 1/3rd or 1/5th or 1/$n$th of a polar switch and meet with correspondingly lower resistances. It is thus seen that the arrangement permits currents corresponding to the higher harmonics to flow in the squirrel cage and thus the forces which are particularly harmful to commutation are largely dissipated in the damper winding rather than at the brushes in the form of sparks and at the same time the normal torque characteristics of the machine are not interfered with to any appreciable extent due to the presence of this damper winding.

The travel of the currents in the damper winding which are responsive to the fundamental flux wave if they were permitted to flow is represented in Fig. 2. This represents a damper winding of a two-pole machine as laid out flat and represents the fundamental flux wave of the machine at F. It is seen that a circulation of current in the squirrel cage corresponding to the fundamental flux requires the current to flow for considerable distances in the high resistance end rings and as a consequence little current will flow in response to this flux.

In Fig. 3 a section of the squirrel cage and the circulation of current for a 5th harmonic flux 5F is represented where it is seen that the end ring path of the current is appreciably shorter so that the resistance to the flow of the 5th harmonic current is very much less than that for the fundamental as depicted in Fig. 2. The result is that the higher harmonic fluxes which would otherwise be harmful to commutation are allowed to produce currents which are dissipated in the squirrel cage without seriously disturbing the fundamental flux of the machine.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. An alternating current dynamo electric machine provided with a commutated winding and a damper winding for dissipating harmonic fluxes of the machine which are of a higher frequency than the fundamental flux frequency of such machine, said damper winding comprising a squirrel cage winding having bars of appreciably lower resistance per unit length as compared to the resistance per unit length of the end rings thereof.

2. An alternating current dynamo electric machine provided with a commutated winding and a damper winding for dissipating harmonic fluxes of the machine which are of a higher frequency than the fundamental flux frequency of such machine, said damper winding comprising a squirrel cage winding in which the ratio of the resistance of its end rings to the resistance of its bars per unit length is not less than about $\frac{5}{1}$.

3. A dynamo electric machine having an alternating current winding and means for reducing the flow of currents therein which have a higher than normal frequency, without materially reducing the flow of normal frequency currents, comprising a squirrel cage damper winding located in close proximity to said first mentioned winding, said squirrel cage having an end ring resistance per unit length at least five times greater than the resistance of its bars.

In witness whereof, I have hereunto set my hand this 23rd day of November, 1927.

WILHELM WEILER.

CERTIFICATE OF CORRECTION.

Patent No. 1,717,289.  Granted June 11, 1929, to

WILHELM WEILER.

It is hereby certified that error appears in the printed specification of the above numbered patent requiring correction as follows: Page 1, line 95, for the word "switch" read "pitch"; and that the said Letters Patent should be read with this correction therein that the same may conform to the record of the case in the Patent Office.

Signed and sealed this 30th day of July, A. D. 1929.

(Seal)

M. J. Moore,
Acting Commissioner of Patents.